United States Patent
Rossi et al.

(10) Patent No.: US 6,748,726 B2
(45) Date of Patent: Jun. 15, 2004

(54) DEVICE FOR PACKAGING PRODUCTS UNDER CONTROLLED ATMOSPHERE IN PACKAGES SEALED WITH A FILM

(76) Inventors: Jean-Pierre Rossi, 6, Rue du Château Boîte Postale 50, Livry-Gargan (FR), F-93190; Marie-José Rossi, 6, Rue du Château Boîte Postale 50, Livry-Gargan (FR), F-93190

( * ) Notice: Subject to any disclaimer, the term of this patent is extended or adjusted under 35 U.S.C. 154(b) by 0 days.

(21) Appl. No.: 09/529,036

(22) PCT Filed: Oct. 6, 1998

(86) PCT No.: PCT/FR98/02126
§ 371 (c)(1),
(2), (4) Date: Apr. 6, 2000

(87) PCT Pub. No.: WO99/17990
PCT Pub. Date: Apr. 15, 1999

(65) Prior Publication Data
US 2003/0131568 A1 Jul. 17, 2003

(30) Foreign Application Priority Data
Oct. 6, 1997 (FR) .............................. 97 12431

(51) Int. Cl.[7] .............................................. B65B 55/00
(52) U.S. Cl. .............................. 53/510; 53/511; 53/432; 53/433
(58) Field of Search ........................ 53/510, 511, 557, 53/432, 433, 442

(56) References Cited

U.S. PATENT DOCUMENTS

| | | | | |
|---|---|---|---|---|
| 3,356,510 A | * | 12/1967 | Barnby | 426/399 |
| 3,832,828 A | * | 9/1974 | Martin | 53/511 |
| 3,992,850 A | * | 11/1976 | Vetter | 53/510 |
| 4,009,552 A | * | 3/1977 | Schlachter | 53/86 |
| 4,058,953 A | * | 11/1977 | Sanborn et al. | 53/433 |
| 4,109,158 A | * | 8/1978 | Blitchington | 250/548 |
| 4,162,599 A | | 7/1979 | Kyle | |
| 4,188,771 A | * | 2/1980 | Kyle | 53/511 |
| 4,263,767 A | * | 4/1981 | Kyle | 53/511 |
| 4,296,588 A | * | 10/1981 | Vetter | 53/86 |
| 4,624,099 A | | 11/1986 | Harder | |
| 4,707,213 A | * | 11/1987 | Mohr et al. | 156/380.2 |
| 4,791,775 A | * | 12/1988 | Raque et al. | 53/510 |
| 5,088,268 A | * | 2/1992 | Gunter | 53/86 |
| 5,271,207 A | | 12/1993 | Epstein et al. | |
| 5,567,048 A | * | 10/1996 | Hammonds | 366/139 |

FOREIGN PATENT DOCUMENTS

| | | | | |
|---|---|---|---|---|
| WO | WO 88/00907 | * | 2/1988 | 206/45 |
| WO | WO 91/03400 | | 3/1991 | |
| WO | WO 96/09210 | | 3/1996 | |

* cited by examiner

*Primary Examiner*—John Sipos
*Assistant Examiner*—Louis Tran
(74) *Attorney, Agent, or Firm*—Young & Thompson

(57) ABSTRACT

A sealing device includes a top part forming a bell and a bottom part forming a vat, receiving a container to be sealed with a film in the chamber defined by the top and bottom parts. The top part includes on a side supplying the film, a slot for the passage of the film running through a wall of the top part, and a device, preferably an inflatable pipe, for obstructing the slot and blocking the film. The wall of the top part also includes a device for inserting and/or extracting fluid, opening inside the chamber between the slot and the wall lower edge, for extracting gas under vacuum, injecting gas and/or filling the container.

18 Claims, 3 Drawing Sheets

DEVICE FOR PACKAGING PRODUCTS UNDER CONTROLLED ATMOSPHERE IN PACKAGES SEALED WITH A FILM

BACKGROUND OF THE INVENTION

The present invention relates to a sealing device for a machine for packaging products in a controlled atmosphere, such as foodstuffs in containers such as trays, pots and similar packages sealed by a film.

The packaging of foodstuffs and other products in such sealed packages is carried out on machines called "sealers" or "thermoformer-sealers", depending on whether the containers to be sealed are produced beforehand on another machine or are produced by thermoforming a thermoplastic sheet, for example, on the same machine as that on which the sealing is carried out. It is often necessary, especially when packaging foodstuffs or pharmaceutical products, for the purpose of achieving better preservation, protection and/or hygiene, to carry out the sealing under a vacuum or in a controlled atmosphere, an operation which involves extracting air and/or injecting gas.

A known and commonly used solution consists in extracting the air and/or injecting the gas via holes made on the sides of the sealing film, along the drive systems. Admittedly, this makes it possible to establish a well-controlled atmosphere in the packages, but it does entail a not insignificant loss of sealing film, the width of the latter having to be substantially greater than that of the containers to be sealed.

Other solutions proposed hitherto for this purpose (see, for example, documents U.S. Pat. Nos. 4,162,599, 4,624,099, 5,271,207 and WO 96/09210) are complicated and expensive, and yet are not entirely satisfactory. In particular, they do not allow satisfactory sealing of the enclosure created around the container to be sealed, especially at the air extraction and/or purge-gas injection system, between the sealing film and the container to be sealed.

From another standpoint, it has not hitherto been possible to completely fill, right to the edges, containers intended to be sealed insofar as the filling takes place at a station located upstream of the sealing station and that the filled container not yet sealed is transferred from the filling station to the sealing station, an operation which involves a movement causing the formation of a wave on the surface of the product contained in the container. This is the reason why hitherto containers have only been partly filled, so that the wave which forms during transfer does not allow the product to spill out of the container or reach or sully the upper edge of the container, something which would prevent the sealing film from being welded to the container.

SUMMARY OF THE INVENTION

The subject of the present invention is a sealing device for a sealed-container packaging machine, which device, while being of particularly simple and reliable structure, ensures perfect leaktightness of the enclosure in which the welding of the sealing film to the container takes place, thus making it possible to create, in the sealed container, a better controlled atmosphere than hitherto.

The subject of the invention is also a sealing device for a sealed-container packaging machine, which allows the containers to be completely filled without the product contained in the container carrying the risk of sullying the upper edge of the container and of compromising the welding of the sealing film to the container.

The sealing device, forming the subject of the invention, is intended for a machine for packaging products under a controlled atmosphere in containers such as trays, pots and similar containers sealed with a film. This device comprises a top part forming a bell provided with a welding head and a bottom part forming a pan. The bottom part receives at least one container to be sealed and interacts with the top part so as to define, around the container to be sealed, an enclosure in which the continuous sealing film brought beforehand onto the container is welded to the container by the welding head of the top part. According to the invention, the top part comprises, in one wall, on the side where the sealing film is brought in, a slot through which the sealing film passes, controlled-actuation closure and immobilization means, for closing off said slot and for immobilizing the film with respect to the top part, and means for the introduction and/or extraction of fluid, emerging inside the enclosure between said slot and the bottom edge of said wall.

Said closure and immobilization means may preferably consist of an inflatable hose placed in said wall, on one side of said slot. Said inflatable hose is advantageously mounted in a hole extending in said wall over the entire width of said slot, in such a way that said slot is secant to said hole.

Said means for the introduction and/or extraction of fluid may comprise gas injection orifices, gas extraction orifices and/or orifices or spouts for filling the container at the sealing station.

Insofar as, on most sealers or thermoformers, the top part of the sealing station comprises, for the purpose of adaptation to containers of different shapes and sizes, a mounting plate on which may be attached, selectively, welding heads of different shapes and sizes and frames of different shapes and sizes, extending around the welding head, said wall, through which the slot capable of being closed off, by the controlled actuation of said closure and immobilization means, passes, advantageously forms part of a frame capable of being attached to the top part, around the welding head, instead of the usual frame.

BRIEF DESCRIPTION OF THE DRAWING

Referring to the appended schematic drawings, an illustrative and nonlimiting embodiment of a sealing device according to the invention will now be described in greater detail; in the drawings.

DETAILED DESCRIPTION OF THE PREFERRED EMBODIMENTS

Figure 1:
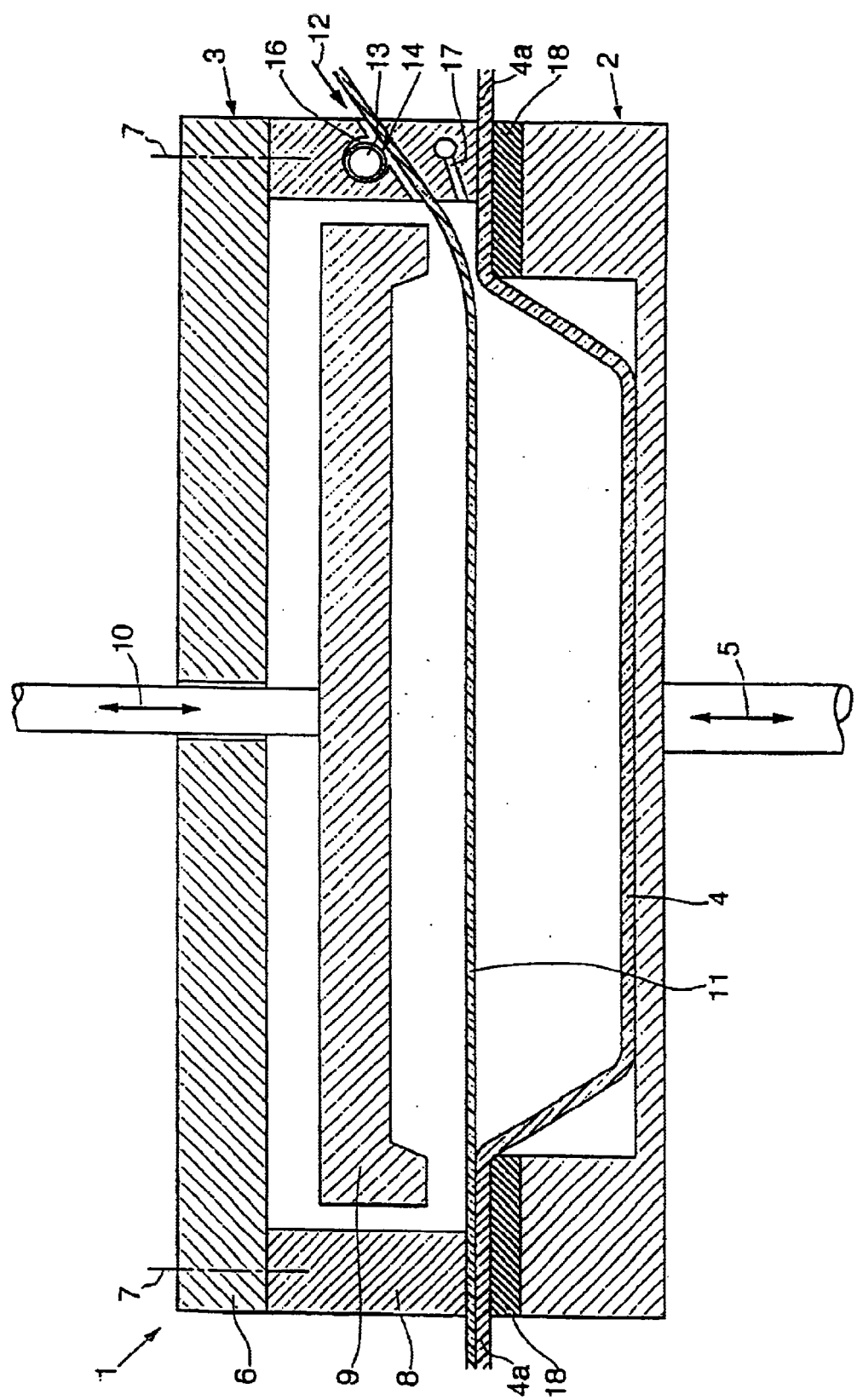
FIG. 1 is a schematic cross section through a device according to the invention for sealing trays.

According to FIG. 1, the sealing device 1 of a machine for packaging products, especially food-stuffs, in thermoformed trays sealed using a welded film, this device here forming part of a thermoformer-sealer, comprises a pan-shaped bottom part 2 or mold and a bell-shaped top part 3.

The bottom part 2, which is intended to receive the tray 4 to be sealed, is able to move vertically up and down, as indicated by an arrow 5, under the action of a control (not illustrated).

The top part 3 is stationary and comprises a mounting plate 6 to the bottom face of which a frame 8 surrounding a welding head 9 is fastened using bolts, only the axes 7 of which have been illustrated. The welding head 9 is able to move vertically up and down with respect to the plate 6, as indicated by an arrow 10, under the action of a control (not illustrated).

The two parts 2 and 3, when they are brought together by raising the bottom part 2 so as to be against the top part 3, define an enclosure in which a continuous sealing film 11 withdrawn from a reserve reel (not illustrated) and brought into the sealing station 1 in the direction of the arrow 12, in order to be placed on top of the tray 4, is welded to the edges 4a of the tray 4 using the welding head 9.

Figure 2:
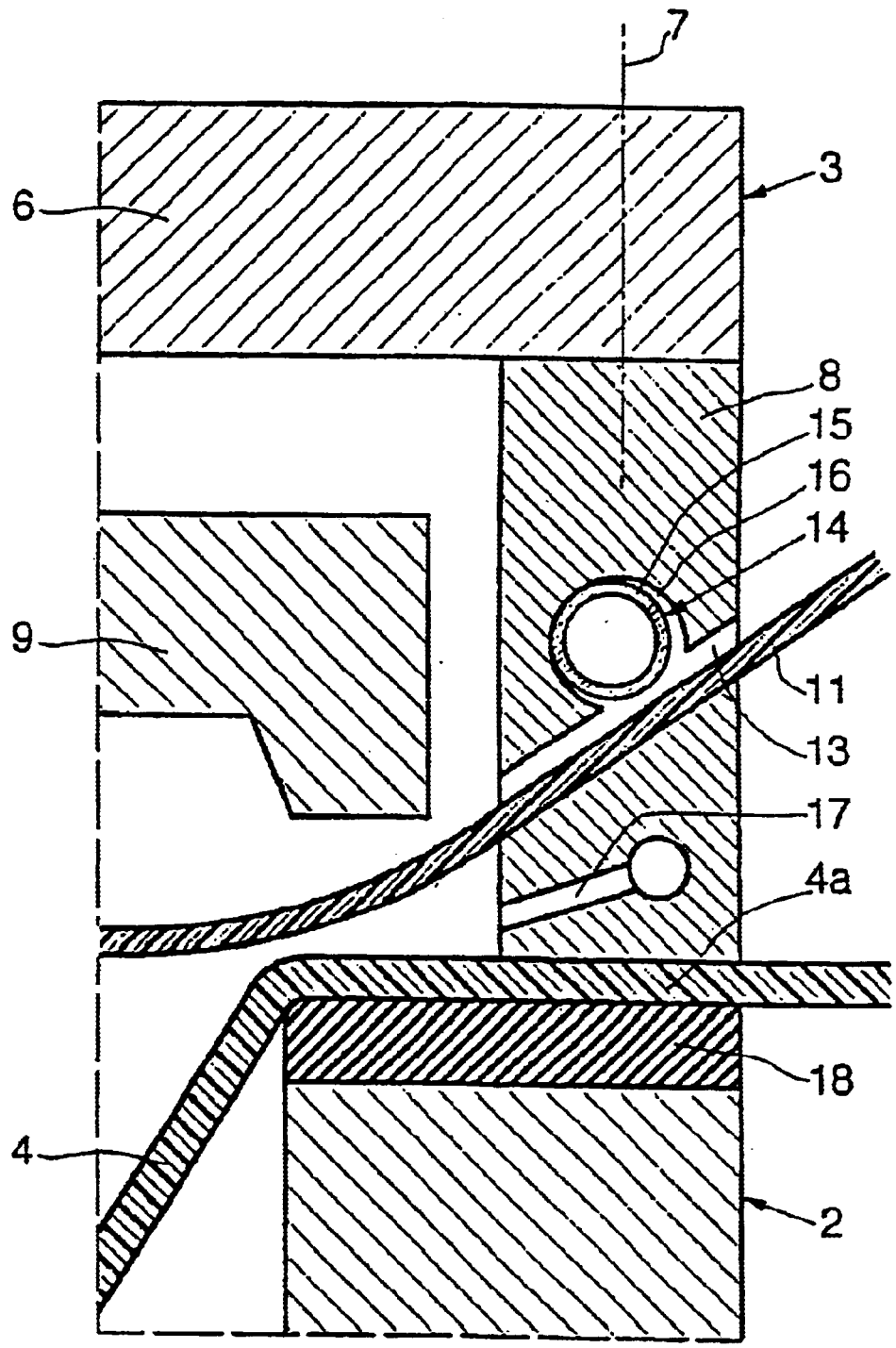
FIG. 2 is a partial cross section, on a larger scale, through the closure and immobilization zone of the device in FIG. 1, in the position before welding.
Figure 3:
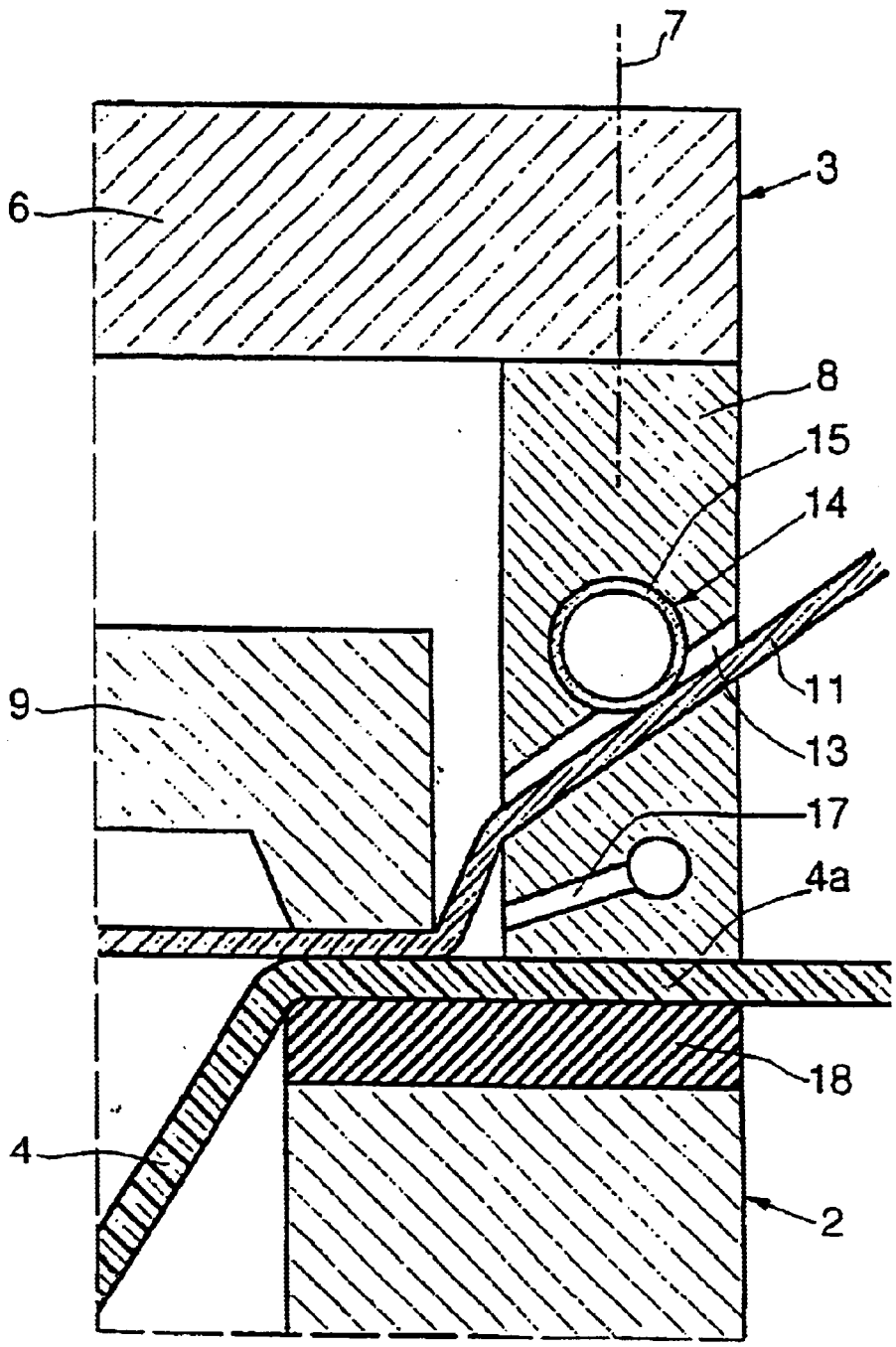
FIG. 3 is a cross section similar to that in FIG. 2, in the welding position.

As is more clearly apparent in FIGS. 2 and 3, a slot 13 passes through the frame 8 of the top part 3 of the welding device, in its wall located on the side where the sealing film 11 is brought in, said slot 13 having a cross section (width and height) greater than the cross section (width and thickness) of the sealing film 11. This slot 13 here is inclined downward, in the feed direction 12 of the film 11, and emerges inside the frame 8 a short distance above the bottom edge of the latter. Associated with the slot 13 is a closure and immobilization means 14 consisting of an inflatable hose, for example made of rubber, mounted in a hole 16 made in the wall of the frame 8, extending over the entire width of the slot 13, in such a way that the slot 13 is secant to the hole 16. The height of the slot 13, the diameter and position of the hole 16 with respect to the slot 13 and the characteristics of the inflatable hose (nature, elasticity, inflation pressure, etc.) are chosen so that when the hose 15 is not inflated it allows the sealing film 11 to pass through the slot 13, whereas when it is inflated it immobilizes the sealing film 11 in the slot 13 and closes off the latter in a leaktight manner.

The frame 8 moreover includes, in the same wall, between the slot 13 and the bottom edge of this wall, one or more nozzles 17 emerging inside the frame 8 below the outlet of the slot 13. These nozzles 17 may be connected to a vacuum source and/or to a gas source (which sources are not illustrated) so as, before the tray 4 is sealed, to make it possible to create a vacuum and/or a gas atmosphere in the tray while the slot 13 is closed off by the inflatable hose 15.

The closure and immobilization means 14 which forms an integral part of the frame 8 of the top part 3 of the sealing device thus makes it possible, in combination with seals 18 provided in a manner known per se on the top edges of the bottom part 4, to ensure that the two parts 2 and 3 of the device define, around the tray 4 to be sealed, a perfectly sealed enclosure in which it is possible to create a perfectly controlled atmosphere (evacuation and/or gas re-injection).

Moreover, it is possible to provide, within the context of the invention, on the frame 8, in addition to or instead of the gas extraction and/or injection nozzles 17, one or more orifices or spouts, which are preferably retractable, for filling the trays with the product to be packaged. It is thus possible, for example, at the sealing station, to fill the trays completely, that is to say right to the edges, without carrying the risk of spillage or of sullying of the edges of the trays, as would be the case in known sealers or thermoformer-sealers in which the filling of the trays takes place at a station located upstream of the sealing station, an operation which involves transferring the filled trays not yet sealed from one station to another. Such orifices or spouts also allow other fluids to be introduced into the trays, for example liquid, pasty or powdered additional products, to be spread out over the surface of the product already contained in the trays.

In the case of filling the trays at the sealing station according to the invention, the filling-sealing operation may be carried out in several steps and may firstly comprise a partial welding of the film to the tray, leaving passages only for the filling spouts, then the filling of the tray via the spouts and, after the spouts have been removed, the final welding of all the passages not yet welded.

It goes without saying that the embodiment illustrated and described was given merely by way of indicative and nonlimiting example and that many modifications and variants are possible within the context of the invention. Thus, the closure and immobilization means 14, instead of consisting of an inflatable hose, could consist of any other means capable of assuming the same function, for example pivoting systems, cam systems, etc. The inflatable hose 15 is distinguished by the simplicity of its structure and of its actuation, and by its great effectiveness. The means 14, instead of lying above the slot 13, could also lie below the slot 13, or on either side of the latter.

The structure and the shape of the two parts 2 and 3 of the sealing device may be modified depending on the nature and the shape of the containers to be sealed, which may be containers other than trays, for example pots. Finally, the sealing device, instead of forming part of a thermoformer-sealer on which the trays are formed from a web material and are filled and sealed before being separated from each other, can also be used on a sealer which is fed with trays already formed.

In addition to closing off the slot 13, the means 14 also immobilizes the sealing film 11 and thus fulfils a function which, on the known sealers, involves the use of an additional device.

Finally, compared with the known devices in which gas is re-injected via holes made in the sealing film, along the sides of the latter, and therefore in a lost part of the film, the sealing device according to the invention allows savings to be made on the sealing film, which may be of the order of 10%, or even greater.

What is claimed is:

1. A sealing device for a machine for packaging products under a controlled atmosphere in containers having an upper opening surrounded by a rim on which a sealing film is to be welded for sealing the container, said device comprising:

a stationary top part forming a bell, said top part comprising a fixed one-piece circumferential wall having a lower free edge;

a bottom part forming a pan having an upper free edge, for receiving at least one container to be sealed, said bottom part being vertically movable between a lower position and an upper position such that in said upper position, said free edges of said top and bottom parts directly engaging one another with said edge of said container therebetween, and said top and bottom parts defining a sealed enclosure around said container; and a welding head movably mounted through an opening in said top part so as to be within a space defined by said fixed one-piece circumferential wall, said welding head being movable vertically up and down between an upper retracted position above said edge of said container, and a lower welding position for welding said film on said edge of said container, said fixed one-piece circumferential wall comprising:

means for feeding a continuous sealing film having a predetermined cross-section through a side of said fixed one-piece circumferential wall and over said opening of said container, said side of said fixed one-piece circumferential wall having a slot having an upper and a lower surface and a fixed cross-section greater than the cross-section of said film, said film passing between said upper and lower surfaces, said slot being above said lower free edge;
an inflatable hose in said slot for closing said slot and immobilizing said film in said slot when actuated; and
means for passing fluid through said fixed one-piece circumferential wall located between said slot and said lower free edge, so that fluid entering inside said enclosure enters between said edge of said container and said film, before said film is welded on said edge of said container by said welding head when said welding head is in said lower welding position,
said fixed one-piece circumferential wall being fixed with respect to said means for passing fluid.

2. The device according to claim 1, wherein said inflatable hose is in a hole in said fixed one-piece circumferential wall extending over an entire longitudinal length of said slot so that said slot is secant to said hole.

3. The device according to claim 1, wherein said means for passing fluid through said enclosure comprise at least one gas injection orifice.

4. The device according to claim 1, wherein said means for passing fluid through said enclosure comprise at least one gas extraction orifice.

5. The device according to claim 1, wherein said means for passing fluid through said enclosure comprise at least one spout for filling said container inside said enclosure.

6. The device according to claim 1, wherein said top part comprises a mounting plate and said fixed one-piece circumferential wall is removably attached to said mounting plate.

7. A sealing device for a machine for packaging products under a controlled atmosphere in containers having an opening surrounded by a rim on which a sealing film is to be welded for sealing the container, said device comprising:
a stationary bell shaped top part having a circumferential wall with a lower free edge, a side of said circumferential wall having first and second stationary parts defining a slot therebetween having an upper and a lower surface having a first fixed cross-section and for receiving a continuous film between said upper and lower surfaces, said film having a second cross-section, said first cross-section being greater than said second cross-section, said slot being above said lower free edge;
a movable bottom part forming a pan having an upper free edge, for receiving at least one container to be sealed, in a first position, said top and bottom parts containing and sealing said container;
a welding head movably mounted through an opening in said top part so as to be within a space defined by said circumferential wall,
said circumferential wall comprising:
  (a) an inflatable hose located on at least one of said first and second stationary parts for closing said slot and immobilizing said film in said slot when inflated; and
  (b) means for passing fluid through said sealed enclosure between said slot and said lower free edge, so that fluid doing one of entering inside said enclosure and exiting said enclosure does one of enters and exits between said edge of said container and said film,
said circumferential wall being fixed with respect to said means for passing fluid.

8. The device according to claim 7, wherein said container is one of a tray or a pot.

9. The device according to claim 7, wherein said packaging products are foodstuffs.

10. The device according to claim 7, further comprising a resilient seal connected to said upper free edge.

11. A sealing device for a machine for packaging products under a controlled atmosphere, said products being filled in a container having an upper opening surrounded by a rim on which a sealing film is to be welded for sealing the container, said device comprising:
a top part forming a bell;
a bottom part forming a pan for receiving said container to be sealed; and
a welding head,
  a) said top part comprising a plate and a surrounding frame below the plate, said frame comprising side walls surrounding an interior space of the top part, said frame being one-piece and having a lower free edge, one of said side walls of said frame having:
    1) a through slot having an upper and a lower surface passing a width of said one of said side walls and extending inside of the interior space above the lower free edge, said slot having a cross section adapted to receive a continuous web of sealing film passing through said upper and lower surfaces of said slot,
    2) a controlled-actuation closure and immobilization means in said slot within the width of said one of said side walls, for closing in a sealed manner said slot and immobilizing said continuous web of sealing film passing through said slot, when actuated; and
    3) means for passing fluid through said one of said side walls, said means for passing fluid being fixed with respect to said one of said side walls, said means for passing fluid extending into the interior space between said through slot and said lower free edge, so that fluid entering through said means for passing fluid enters in said interior space between said lower free edge of said one of said side walls and said continuous web of film passing through said slot;
  b) said bottom part having an upper free edge, and being movable vertically up and down with respect to said top part, between a lower position and an upper position in which said upper free edge of said bottom part engages said lower free edge of said frame of said top part, such that in said upper position, said lower free edge of said frame of said top part and said upper free edge of said bottom part are adapted to engage with a rim of a container received in the bottom part, so as to define a sealed enclosure around said container;
  c) said welding head being movably mounted through an opening in said top part so as to be within said interior space surrounded by said side walls of said frame, said welding head being movable vertically up and down between an upper retracted position and a lower welding position.

12. The device according to claim 11, wherein said closure and immobilization means comprise an inflatable hose in said one of said side walls on at least one side of said slot.

13. The device according to claim 12, wherein said inflatable hose is in a hole in said one of said side walls extending over an entire longitudinal length of said slot so that said slot is secant to said hole.

14. The device according to claim 11, wherein said means for passing fluid through said one of said side walls comprise at least one gas injection orifice.

15. The device according to claim 11, wherein said means for passing fluid through said one of said side walls comprise at least one gas extraction orifice.

16. The device according to claim 11, wherein said means for passing fluid through said one of said side walls comprise at least one spout for filling said container inside said enclosure.

17. The device according to claim 11, wherein said side walls are removably attached to said plate.

18. The device as claimed in claim 11, wherein the closure and immobilization means and the means for passing fluid are independently operable.

* * * * *